United States Patent [19]

Thomas

[11] Patent Number: 4,796,292
[45] Date of Patent: Jan. 3, 1989

[54] DATA TRANSMISSION OVER THE PUBLIC SWITCHED NETWORK

[75] Inventor: Jerry S. Thomas, Phoenix, Ariz.

[73] Assignee: American Express Company, New York, N.Y.

[21] Appl. No.: 129,979

[22] Filed: Dec. 8, 1987

[51] Int. Cl.$^4$ .............................................. H04M 1/57
[52] U.S. Cl. ........................................ 379/91; 235/381
[58] Field of Search ................... 379/220, 91, 144, 94; 358/86; 235/380, 381

[56] References Cited

U.S. PATENT DOCUMENTS

| | | | |
|---|---|---|---|
| 4,567,359 | 1/1986 | Lockwood | 235/381 |
| 4,715,061 | 12/1987 | Norwich | 379/91 |
| 4,750,199 | 6/1988 | Norwich | 379/91 |
| 4,750,201 | 6/1988 | Hodgson et al. | 379/144 |
| 4,756,020 | 7/1988 | Fodale | 379/112 |
| 4,763,191 | 8/1988 | Gordon et al. | 358/86 |

FOREIGN PATENT DOCUMENTS

8704884  8/1987  World Int. Prop. O. ............ 358/86

Primary Examiner—Robert Lev
Attorney, Agent, or Firm—Gottlieb, Rackman & Reisman

[57] ABSTRACT

A credit card authorization network which, among other advantages, allows telephone charges to be reduced. A credit card company, operating as an Interexchange Customer, provides trunk-protocol executing modems at a Feature Group B access facility. The modems are interfaced to the trunks, on a T1 digital link, by adapting FXS channel bank cards with a ground start option to translate between E&M signaling and ground start loop signaling.

23 Claims, 6 Drawing Sheets

*FIG. 7A* PRIOR ART APPROACH

*FIG. 7B*

| PERIPHERAL INTERFACE PROVIDES | PCM TRANSMIT SIGNALING BITS | | | | PCM RECEIVE SIGNALING BITS | | | | CHANNEL CARD INTERFACE PROVIDES |
|---|---|---|---|---|---|---|---|---|---|
| | FXS | | E&M | | FXS | | E&M | | |
| | A | B | A | B | A | B | A | B | |
| LOOP OPEN/IDLE | 0 | 1 | 0 | 0 | 1 | 1 | 0 | 0 | TIP OPEN/IDLE |
| RING GROUND | 0 | 0 | NA | NA | 0 | 1 | NA | NA | TIP GROUND |
| LOOP CLOSED/BUSY | 1 | 1 | 1 | 1 | 0 | 0 | 1 | 1 | TG & RINGING/BUSY |

(NA) NOT APPLICABLE TO E&M

DATA TRANSMISSION OVER THE PUBLIC SWITCHED NETWORK

DESCRIPTION

This invention relates to the transmission of data over the public switched network, and more particularly to improved credit card authorization transactions.

The traditional approach to credit card authorization transactions is to provide a service establishment, such as a store, with a special authorization terminal equipped with an internal asynchronous modem which is connected to a local telephone line. When a credit card is moved through a slot on the terminal past a magnetic stripe reader, information is collected from the magnetic stripe of the card. The terminal then goes off-hook on the telephone line and dials a number previously programmed into the terminal. Equipment, including a modem, at the called site answers the call. The answering modem may be part of a Value Added Network (VAN), such as those whose services are provided under the service marks Compuserve and Tymnet, or part of the credit card company's own private network. Typically, a number of such modems, all terminating respective lines which are called when a credit card authorization transaction is required, are connected to a Packet Assembler/Disassembler (PAD) or other multiplexer or concentrator which may be connected via a leased line or network to a host computer at a central location. After the call is answered, data communication is established. The data transmission for dial-up credit card authorizations is most often governed by the Visa protocol. Information from the magnetic stripe, information previously programmed into the terminal, and information keyed into the terminal by the merchant about the specific sale are transmitted up-line to the host where the request is processed and an authorization code or other information (e.g., a request to call for voice authorization) is transmitted back to the terminal. Upon receiving the response, the terminal goes on-hook and the call is terminated. Many terminals can be programmed to dial different numbers based upon the information contained in the magnetic stripe on the card being processed.

The most common access provided by a VAN is a local telephone number which is then pre-programmed into the terminal by the institution providing the authorization service. The VAN sets up distinct telephone line groups, each with its own telephone number, for each major customer. This is done in each of the major cities. It is not necessary for a VAN to provide a group of lines in every central office. It is possible in a particular city for the call from a service establishment to go over trunk lines between central offices to a particular central office at which the VAN has lines. However, the local calling area for local lines typically does not cover an entire city, and most major cities may require multiple installations, with different groups of terminals in the same city thus having to dial different numbers. Suburbs, rural communities, smaller cities, and other areas in which the traffic cannot justify special installations of the type described must be serviced by having the terminal dial an 800 number, the VAN having appropriate equipment at a more central site for handling incoming calls. In cities with measured rate local service, a typical credit card authorization transaction costs the service establishment five to seven cents for the local call to a line at the VAN's equipment location. (A credit card authorization may require only several seconds to execute, but there is a minimum charge for a local call.) The VAN typically charges the credit card company about six cents for processing the transaction (plus an additional fifteen cents or so that it must pay for 800 service if the incoming call is to an 800 number which the VAN is using.)

There are at least four problems with this arrangement. First, the charges, especially the five to seven cents paid by the service establishment for a call which lasts only several seconds, are excessive. Second, some credit card companies, such as American Express, would prefer to absorb the local-call charges incurred by the service establishment, if they could be made reasonable. (There are some cases even now for which the credit card company absorbs all transaction authorization costs—but the charges are even higher than they would otherwise have to be. To avoid having the service establishment charged for a local call, the service establishment dials an 800 number, and the VAN is thus able to pass along to the credit card company all of the costs incurred—including the extra charges for 800 service. All of this is required, including the technologically unnecessary 800-call charges, just so that the service establishment will not be billed for a local call.) Third, because the service establishments in each major city have to have terminals which dial a local telephone number which is unique to that city, or unique to a local calling area within that city, corresponding to the VAN's lines in that city or local calling area, the credit card company must program terminals differently for each major city or other territory associated with a specific number. It would obviously make things much easier if the same telephone number could be used throughout the country. Fourth, the geographical area served by local lines is often too small to justify installation of equipment, thus forcing the credit card company to use the more expensive 800 access. This in turn means that a smaller percentage of transactions are authorized in order to keep costs to a minimum.

There are other problems with this kind of standard network approach, but there also has been some progress made in connection with these other problems. Perhaps the area of most concern is the speed of a transaction. In order to speed up the handling of calls placed by service establishments, American Express, as just one example, provided its own VAN type network some time ago. Modems and PADs were placed on local lines in different cities, and the PADs communicated over leased lines to an authorization host using the X.25 protocol. The PADs were equipped to support the Visa polling protocol; a PAD polled the terminals, and then communicated rapidly with the host using the X.25 protocol.

To further speed up a transaction, the American Express modems were provided with ground start interfaces. A call incoming from a service establishment could actually be answered by the modem before it rang. A call arriving on a ground start line is "announced" by the central office placing a ground on the tip side of the line, the tip normally being open when the line is not in use. The grounding of the tip is followed shortly by ringing, but it is often possible to answer an incoming call before ringing is even detected by the called modem. (The ground start technique was originally used to resolve the long-standing problem of "collision" where a party on a PBX dials a 9 to get an outgoing line and instead ends up with an incoming call because the PBX equipment was unable to recognize from the ground start signal on the line that it had ben seized by the central office.) Another way in which the transaction time was reduced was to start the modem "training" period, by which the two modems at the ends of the line get into sync, even before the two-second billing protection interval had expired. (The FCC requires that data transmission begin only after an initial two-second interval, but there is nothing in the FCC regulations which prohibit early start of the sync process.)

These improvements, in use for more than a year and thus part of the prior art, illustrate the kinds of things which were done to improve the overall credit authorization process, but they have nothing to do with the subject invention and the solutions to the problems enumerated above (other than that the subject invention also utilizes modems, and toward that end it is advantageous to use the fastest modems available).

The solutions to the problems discussed above are predicated on some of the peculiarities in telephone service which resulted from break-up of the Bell System. To understand the way in which advantage is taken of the telephone scheme which now exists in the United States, it is necessary to first describe that scheme, something which is difficult to do without reference to drawings. Suffice it to say in this general description, and in the context of a credit card authorization network, that the invention contemplates a credit card company, such as American Express, becoming an Interexchange Customer (IC) subscribing to Switched Access Services, with each of its modems, situated at the location of one of its access facilities, having an associated dedicated circuit for interfacing with a respective Feature Group B or D trunk accessed by a terminal calling through an Exchange Carrier, with each modem thus interfacing with a trunk facility (as opposed to the usual line) and communicating through a PAD or the like over a communication channel to a cost.

Further objects, features and advantages of my invention will become apparent upon consideration of the following detailed description in conjunction with the drawing, in which.

Figure 1:
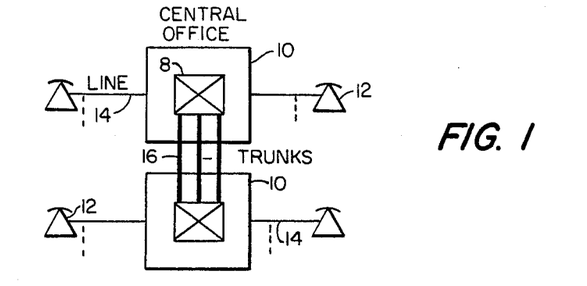
FIG. 1 depicts the public telephone switched network as it existed before the Bell System break-up.

The public telephone switched network, as it existed before the Bell System break-up, is shown in grossly simplified form in FIG. 1. Each central office 10 provided service over telephone lines 14 to telephone equipments 12. Central offices were connected to each other by trunks 16. Throughout the drawings, trunks are distinguished from telephone lines by the use of heavy lines. Each central office included a switch 8 for effecting connections between lines and lines, and lines and trunks. (Other switching facilities were provided for effecting trunk-trunk interconnections.) In general, a trunk is a communication path in a network which connects two switching systems. A trunk circuit, associated with the connection of a trunk to a switching system, serves to convert between the signal formats used internally in the switching system and those used in the transmission circuit, and it performs logic and sometimes memory functions associated with supervision. A line, on the other hand, is a pair of wires carrying direct current between a central office and a customer's terminal; a line-side connection is a connection of central office equipment to a line.

As the public switched telephone network grew over the years, numerous interfaces and protocols developed and became standard. An interface is a shared boundary defined by common physical interconnection characteristics, signal characteristics, and meanings of interchanged signals. (In telephony, the term "signaling" means the transmission of information to establish, monitor, or release connections and provide network control.) Lines interfaced to central offices in ways which were distinct from those in which trunks interfaced to central offices. The physical connections were different, and even the number of wires could be different. Certainly, the signalings were different. A protocol consists of procedures for communication between a sender and a receiver, of supervisory and address information, in order to establish and maintain a communications path. It is an agreed-to set of procedures so that communications between two ends will be intelligible in both directions (transmit and receive).

Figure 2:
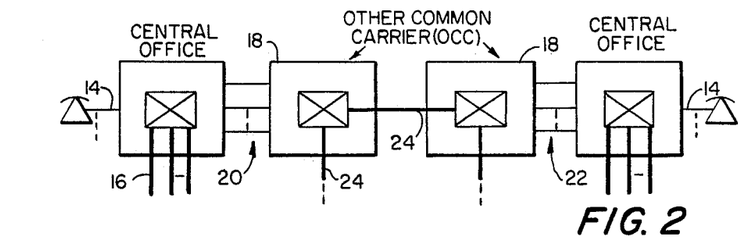
FIG. 2 depicts the public telephone switched network as it existed before the Bell System break-up and after the entry of other common carriers.

As the years went by and AT&T faced competition from other common carriers (OCCs), the public telephone switched network developed as shown, once again grossly simplified, in FIG. 2. Bell System central offices were still connected by trunks 16 to other central offices. An OCC such as MCI or Sprint would provide switches 18 which could be accessed from central office lines. The OCC switches would be interconnected via their own network trunks 24. In order to gain access to a common carrier other than AT&T, a telephone subscriber would be connected over a telephone line to his central office, through his central office and perhaps others, and finally over another telephone line assigned to the OCC.

The quality of communication was generally not as good when going through the facilities of an OCC. This was the case even though the trunks actually used by the OCCs were leased from AT&T. The reason had to do with the fact that poor performance is attributable most often to the inferior transmission performance on line-side connections. A typical AT&T Bell System call involved two lines 14, one at each end of the overall communication path; all other interfaces along the way involved trunk connections. An OCC, on the other hand, had an additional two line interfaces, as shown by the numerals 20 and 22 in FIG. 2. Because each central office was connected over lines, not trunks, to an OCC switch, there were four line segments in each call, not just two.

In order that the common carriers other than AT&T be able to provide the same superior service following break-up of the Bell System, and in order that equal access to the local exchange users be given to all long distance Interstate Carriers, several access arrangements were made available. These access arrangements are known as Switched Access Services. The term "Interexchange Customer" (IC) is used to denote any subscriber of Switched Access Services, including an Interexchange Carrier.

Figure 3:
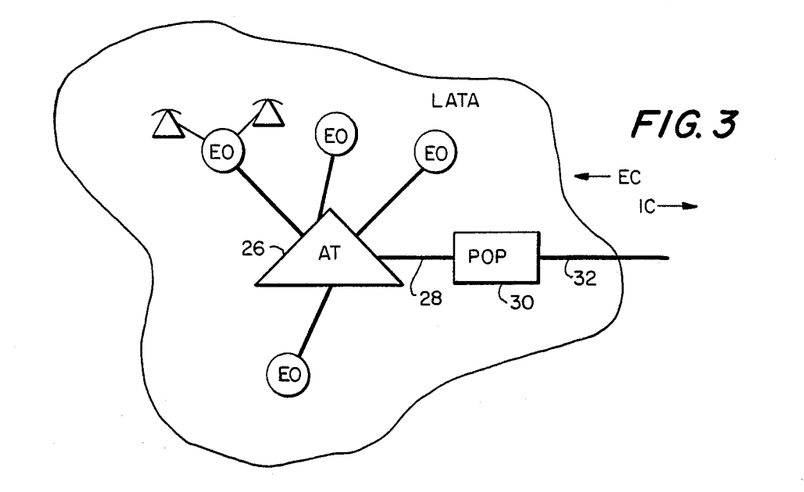
FIG. 3 depicts a typical present-day Local Access and Transport Area (LATA)

The geographic areas served by the Bell Operating Companies have been divided into Local Access and Transport Areas (LATAs). A typical LATA is shown in FIG. 3. A LATA is an area within which a Bell Operating Company—an Exchange Carrier (EC)—may offer telecommunication services. Interexchange Carriers and other ICs provide services between LATAs. The Interexchange Carriers are, of course, AT&T, MCI, Sprint, and others. The specific switched access arrangements offered by the Bell Operating Companies are known as the Feature Groups. An End Office (EO) is a Bell Operating Company switching system within a LATA where customer station loops (lines) are terminated for purposes of interconnection to each other and to trunks; a call may go directly from an End Office or be tandemed through a second office known as an Access Tandem (AT) to reach the IC. (A Tandem is a switching system in the message network that establishes trunk-to-trunk connections). The important thing to note is that, as shown in FIG. 3, telecommunications within a LATA are handled by an EC, whereas telecommunications from one LATA to another are handled by an IC.

An IC under the present scheme designates a location within a LATA for the connection of its facilities with those of the Bell Operating Company which serves that LATA. (There are about two hundred LATAs in the United States, and each of the Bell Operating Companies serves all or portions of multiple LATAs.) The location of interconnection designated by the IC is called a Point Of Presence (POP), and typically it is at a building that houses an IC's switching system or facility node. An IC may have more than one POP within a LATA. In FIG. 3 a POP is shown by the numeral 30. An aggregate of one or more IC trunks is shown by the numeral 32. Instead of the POP being connected to a single central office, what usually happens is that it is connected by trunks to an Access Tandem (AT). The AT, shown by the numeral 26 in FIG. 3, is in turn connected to multiple central offices by means of trunks. An Access Tandem is a Bell Operating Company switching system that provides a traffic concentration and distribution function for inter-LATA traffic originating/terminating within a LATA. The AT thus provides the IC with access to more than one End Office within the LATA. (A central office is an End Office.)

For present purposes, what is important is that the EC offers the IC a choice of four switched access arrangements, called Feature Groups. Each IC, based on its own technical needs and business considerations, selects the access arrangement that it wants. The access arrangement involves a multiplicity of interfaces represented in FIG. 3 by the single trunk 28, it being understood that the drawing is only symbolic and there are in fact as many connections as there are maximum number of simultaneous calls that the IC expects to handle.

Feature Group A is a two-wire line-side connection between the IC and the EC. Feature Group A is not of particular interest because it is a line-side connection; it will be recalled from the discussion of FIG. 2 that it is line-side connections, depicted by the numerals 20 and 22, that put a long-distance carrier at a disadvantage in the first place prior to the Bell System break-up. (Feature Group A is also the only one of the four access arrangements for which the calling party is billed any local tariffed charges, i.e., message units.)

The other three Feature Groups involve trunk-side connections.

Feature Group B has an associated universal 7-digit (950-0/1XXX) access code and is used for the purpose of originating or terminating calls to or from subscribers. The XXX code is unique to each IC and, most importantly, it is the same throughout the country in all LATAs in which the IC has a presence. Feature Group B access arrangements include trunk signaling, trunk protocols, trunk transmission and trunk testing, and they provide answer and disconnect supervision. There can be two-wire and four-wire trunk terminating equipment, and, in general, there are supplemental features (as there are in the other Feature Groups) which are offered that allow an IC to specify substitutions for, or additions to, the standard arrangements as defined by the appropriate tariff.

Feature Group C exists now but is transitional. AT&T, whose trunk-side connections are presently Feature Group C, will convert to Feature Group D as it becomes available. Feature Group B involves 2-stage dialing, the kind of arrangement which existed before subscribers could select an IC other than AT&T. With an arrangement such as that shown in FIG. 2, a first number is dialed in order to gain access to a line which is connected to the OCC facility. after a connection is established, a second number is dialed to tell the OCC the destination of the call. Feature Group D, on the hand, provides true "Equal Access" in that a customer can pre-subscribe to the long-distance carrier of his choice. By dialing the digit 1, his call will be connected to a Feature Group D trunk at the selected IC's Point Of Presence. There is only one number dialed, that of the destination. While the subject invention is certainly applicable to Feature Group D service, the illustrative embodiment of the invention is described in terms of Feature Group B service.

Once a caller gains access to an IC's facilities, any subsequent dialing procedures are as specified by the IC. In-band tone dialing is usually employed, but in any event the EC is transparent to address signaling and data communications between the subscriber and the IC. As far as the interface between the EC and the IC is concerned, the IC can specify the type of supervisory signaling and interface to be used between the Bell Operating Company access facilities and the IC facilities at the IC's point of presence. The signaling options and interfaces that are available vary with the particular Feature Group and tariff.

Figure 4:
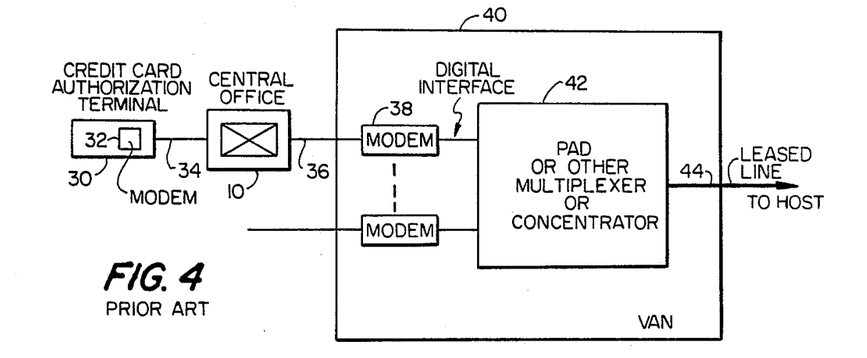
FIG. 4 shows a prior art credit card authorization scheme.

A prior art credit card authorization scheme is shown in FIG. 4. A credit card authorization terminal 30 is connected via an ordinary telephone line 34 to a central office 10. The authorization terminal includes a standard modem 32. At the beginning of the authorization process, the terminal dials a number which is associated with a line connected to a particular Value Added Network. The connection is established through central office 10. In the VAN 40, line 36 is connected to modem 38. Using the Visa protocol, the two modems communicate with each other. Modem 38 is connected via a digital interface to a Packet Assembler/Disassembler 42 or some other multiplexer or concentrator within the VAN. The PAD establishes communication with a host over leased line 44 or some other communication channel.

As described above, the service establishment pays for a local call to the VAN. The VAN charges the credit card company for handling the call. There is no way to reduce the charges paid by the service establishment because a local call through the central office is being placed. It is also apparent that depending upon the location of the VAN in a particular city, the authorization terminals must have different numbers pre-programmed in their automatic dialers.

Figure 5:
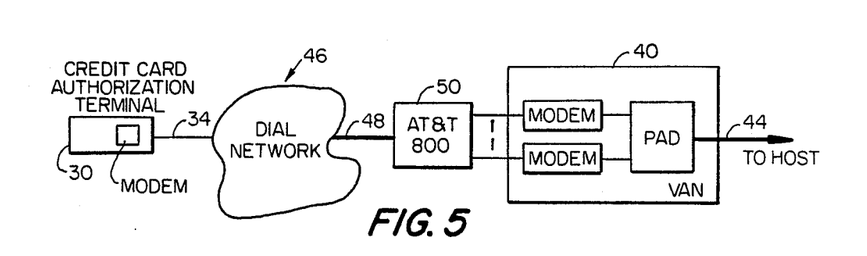
FIG. 5 shows how a service establishment can be relieved from paying for a local call during a credit card authorization transaction.

What is shown in FIG. 5 is the only way that a service establishment can be relieved of paying for a local call. Also, the scheme of FIG. 5 must be employed when there is no VAN presence near the credit card authorization terminal. In this case the terminal establishes a call through the dial network 46, and over line 34 and trunk 48 to an AT&T facility 50. The AT&T lines are extended as an 800 call to modems in VAN 40. In this case the service establishment does not pay for the call; AT&T pays the Bell Operating Company. The credit card company picks up all charges of AT&T and the VAN. The arrangement of FIG. 5 is hardly preferred because of the cost of an 800 call.

Figure 6:
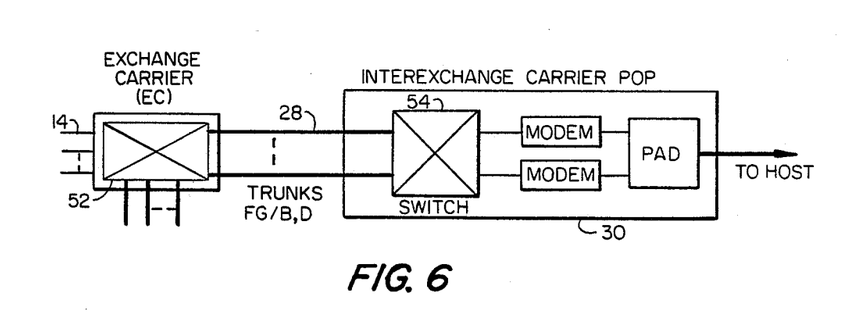
FIG. 6 depicts an arrangement which, while not an embodiment of the invention, will serve as a bridge to an understanding of the invention.

The arrangement of FIG. 6 is not an embodiment of the invention. However, it will serve as a bridge to an understanding of the invention; it is the kind of system which might be devised by a "telephone man". Lines 14 are connected to authorization terminals and they are within the LATA of the Exchange Carrier. Some of the EC trunks, Feature Group B or D, are extended to the Point Of Presence of an IC. A switch 54 is provided for extending trunks 28 to their destinations, in this case lines connected to modems and a PAD. Communications originate in the terminal, and a terminating modem in the POP is required to communicate with the modem in the terminal. Modems interface with lines, not trunks. A switch is the standard mechanism for interconnecting lines and trunks. Since only trunks come into the POP, a switch is necessary to connect an incoming trunk to a modem line (just as the switch of a central office connects a trunk and a subscriber line).

This straight-forward approach allows a terminal to be connected to the host. The service establishment need not be billed for the call because with Feature Group B or D service, the IC pays the EC for each call which is placed. The IC is the only source of billing to the calling party, and with switching equipment having sufficient intelligence, it would be possible for the IC to bill the credit card company for calls placed to its host installation. The scheme is not feasible, however, because of the cost of switch 54. A typical modem costs in the order of $500. A switch for 100 lines costs in the order of $200,000. That makes the cost per modem not $500, but $2,500. That is impractical. And there is no apparent way to avoid the use of the switch. There is a modem in each authorization terminal. There must be a modem at the other end of the connection. Modems have line connections. The EC/IC interface is over a Feature Group B or D trunk. There is no way that a trunk can be interfaced with a conventional modem. Not only may the number of wires in the trunk be different from the number of wires at the modem input, but the signaling requirements are totally different. A costly switch is the device which allows a modem line to be connected to a trunk.

In accordance with the principles of my invention, when it is employed in a network for authorizing credit card transactions, the credit card company, such as American Express, is given its own 3-digit Customer Identification Code (CIC). It becomes an Interexchange Customer. At its POP, it has dedicated modems and a PAD or other multiplexer or concentrator. But the switch is eliminated. Instead, the modem arrangement provides a trunk-side interface. In the illustrative embodiment of the invention, E&M signaling and T1 interfaces were selected It will be recalled that with Feature Group B or D, the IC can tell the Bell Operating Company the kind of signaling and interface that it desires on its trunk facilities within the bounds of the applicable tariff. By providing each modem with a trunkside interface, the cost of the modem increases from perhaps $500 to $700, considerably less than $2,500.

By a credit card company such as American Express becoming an IC, all of its authorization terminals, in all LATAs in which it has a presence, need dial the same number. That number, 950-0/1XXX, where XXX is American Express's CIC number, always gains access to a Feature Group B trunk of the local EC, and that trunk appears at an American Express POP in the respective LATA. American Express, as an IC, simply need not bill the "subscribers" which access its trunks, i.e., the service establishments. The IC in this case simply absorbs all costs. More significantly, the overall communications charges are greatly reduced. Whereas in the prior art network of FIG. 4 the local telephone message unit charge to a subscriber was in the order of five to seven cents for each call, with Feature Group B or D service the IC pays the Bell Operating Company charges which are based on time. The charge for a typical credit card authorization is between one and two cents. Thus while the credit card company absorbs all of the transaction costs, the cost associated with the local telephone call part of the transaction is reduced very substantially. (Whether the other costs, paid to the VAN, in the prior art system of FIG. 4 are reduced in the scheme of the invention depends primarily on efficiencies of the credit card company operations.)

In order for the scheme to work, each modem of the invention requires a new interface which meets Feature Group B or D specifications, and the modem must be capable of exercising trunk protocols. This is brought out in FIGS. 7A and 7B. The former depicts the prior art approach and corresponds to the system of FIG. 6; the latter corresponds to the system of the invention to be described below.

The numeral 60 depicts symbolically the entrance to the EC network; with reference to FIG. 3, the numeral 60 would be the Access Tandem 26. The EC establishes a trunk connection. To do this there must be a trunk hardware interface, shown symbolically by solid lines in FIGS. 7A and 7B. The Access Tandem exercises a trunk protocol, and protocols, as opposed to hardware interfaces, are depicted symbolically by dashed lines in FIGS. 7A and 7B. There is not necessarily only one trunk protocol which can be used with each trunk hardware interface, although signaling limitations of particular hardware interfaces necessarily restrict the number of applicable trunk protocols.

Figures 7A, 7B:
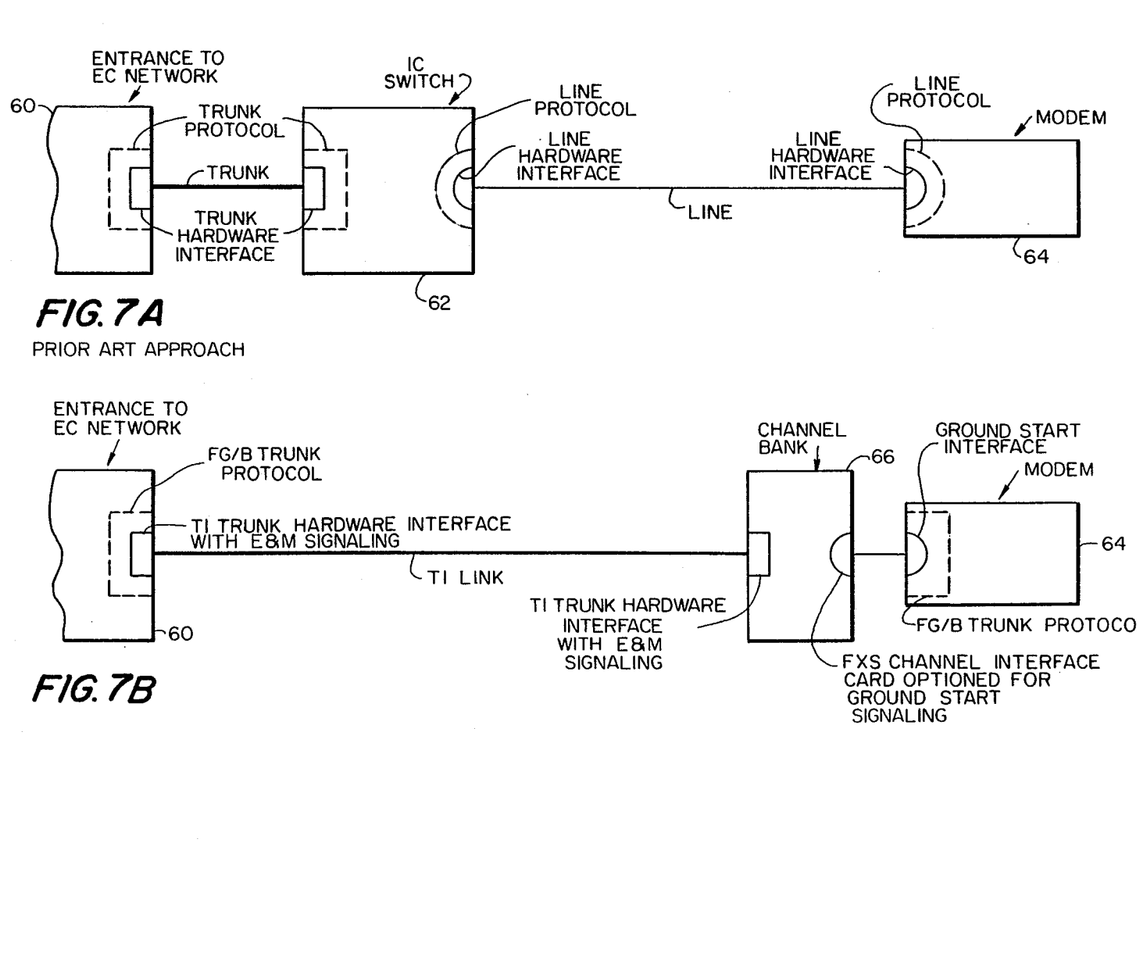
FIGS. 7A and 7B depict two approaches to setting up a credit card authorization system, those of the prior art and the invention.

The typical modem 64 exercises a line protocol and it is provided with a line hardware interface, as shown in FIG. 7A. In order to convert between a trunk over which a trunk protocol is executed and a line over which a line protocol is executed, traditional telephone practice would require the use of a switch 62 by the IC, corresponding to switch 54 in FIG. 6. The switch could have trunk hardware interfaces at the trunk side and would execute a trunk protocol for communicating with the EC, and it would have line hardware interface at the line side and would execute a line protocol for communicating with the modem. As described above, it is the cost of the switch which is the stumbling block. (FIG. 7A in fact depicts present-day 800 service, and the similarity to FIG. 5 will be apparent.)

FIG. 7B depicts the approach taken in the invention. Nothing corresponding to IC switch 62 is used. The EC provides Feature Group B service on T1 access facilities. A conventional T1 trunk hardware interface is used, and a conventional E&M trunk protocol is employed. The particular interface and protocol are not arbitrary and offer great advantages, as will be described. At the other end of the T1 link is a conventional channel bank. The T1 link has 24 channels. A channel bank, such as the standard Rockwell D3/D4 channel bank, shown by the numeral 66 in FIG. 7B, includes an individual card for each of the 24 channels in a T1 digital facility. The channel bank thus includes a T1 trunk hardware interface. As will be described, the channel bank is provided with an FXS interface card which, in the illustrative embodiment of the invention, is optioned for ground start. The modification to the channel interface card which is required in order to implement the preferred embodiment of the invention will be described below. The channel interface card and the modem have ground start interfaces. The modem is designed to execute a trunk protocol, the second modification to a standard system block which will be described below. The net result is that at the two ends of the transmission path, at the EC and the modem, a trunk protocol is executed, and thus the two ends can communicate with each other. This is accomplished without the use of an intervening IC switch.

Figure 8:
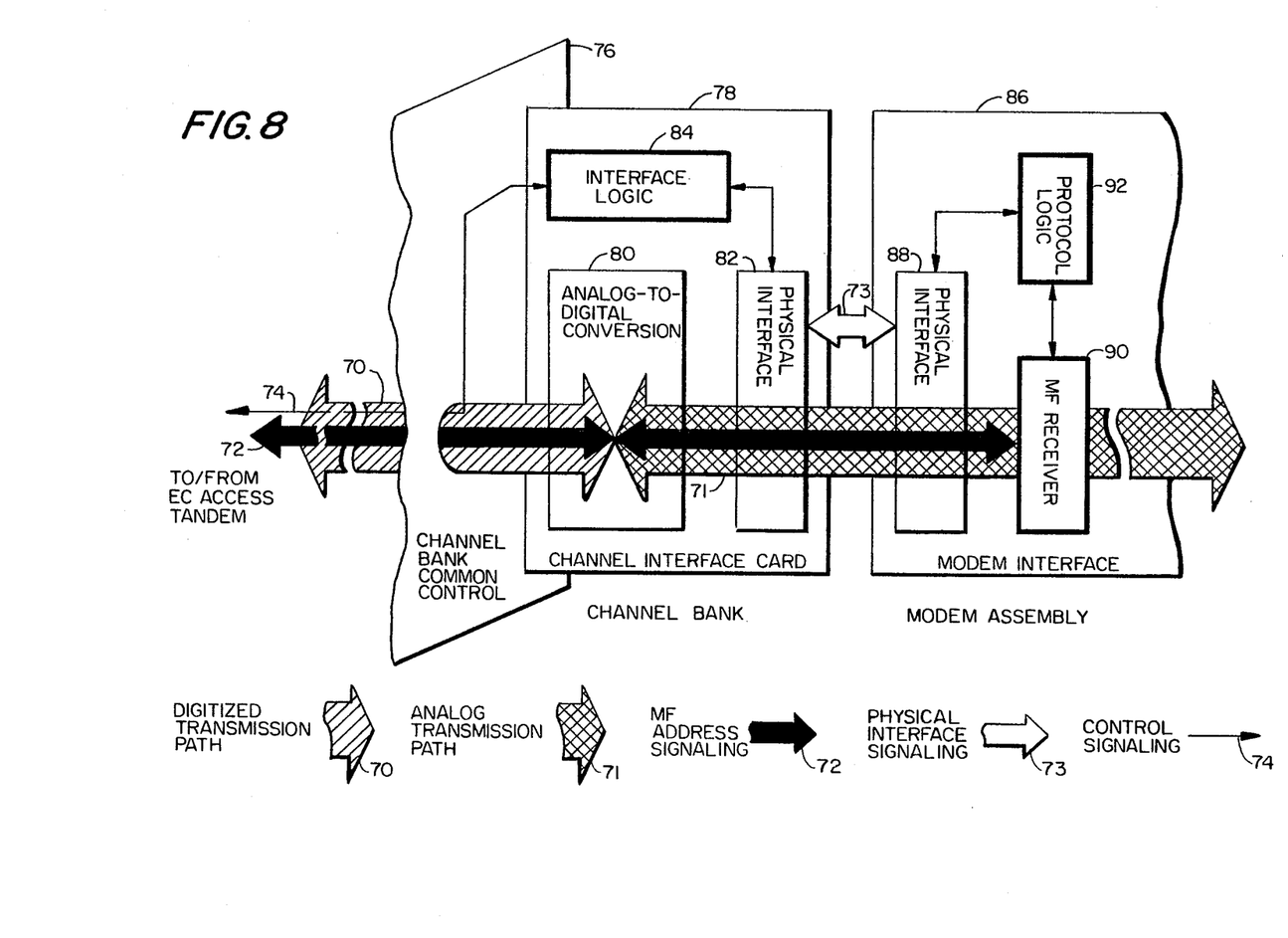
FIG. 8 is a functional representation of the manner in which standard system blocks can be modified to implement the invention, and thus represents the preferred embodiment of the invention.

FIG. 8 is a functional diagram showing how the preferred embodiment of the invention is constructed from standard system blocks with only minor modifications. The code at the bottom of FIG. 8, which represents the symbolism used in the drawing for transmission, address and control signaling, and physical interface signaling, allows symbolic representation of a T1 digital facility. The facility provides for 24 individual time division multiplex channels with associated framing bits. Each 64-kb channel has two low-speed bit streams for transmit and receive signaling. The bits are referred to as transmit and receive A and B bits. Thus there are up to four possible signaling states which can be transmitted in each direction.

A TI access facility is selected because it facilitates a physical interface conversion, as will become apparent from the description of FIG. 8. Feature Group B service, when provided on a T1 link, is always provisioned with the E&M supervisory signaling format, thereby indicating that an E&M physical interface would be appropriate; this is a requirement of the applicable tariff. The physical analog interface required by the selected modem, however, is a ground start loop interface; a ground start interface provides for the fastest possible operation since there is no need for the modem to wait for incoming ringing. Separate and apart from protocol considerations, some way must be found to make compatible the E&M trunk supervisory signaling at one end and the ground start loop signaling at the other end.

A conventional channel interface card performs two functions. The first is to encode/decode digital transmission on an individual T1 channel from/into an analog signal. The second function of the channel interface card is to translate physical interface signals from/into the appropriate supervisory signaling. The supervisory signaling for each channel consists of the A and B bits referred to above. The appropriate supervisory signaling format is a function of the physical interface supported on the channel interface card. In normal practice, the same kind of interface cards are arranged at both ends of each channel, in channel banks. In the system of FIG. 7B, where the T1 digital encoding is done directly by an EC switch at one end, the appropriate channel interface card which would normally be used would be selected based on the signaling specified by the switch interface. This insures that the supervisory signaling is the same at both ends. (The standard supervisory signaling formats are defined in product descriptions of various channel bank and switch manufacturers as well as AT&T, Bellcore and other telephone company technical documentation.) Because E&M supervisory signaling is used at the EC end of the transmission path in FIG. 7B, it would appear that an E&M interface would be required for the modem. There is no E&M channel bank card, however, which is available for use in a channel bank and which could be adapted readily to provide a ground start interface for the modem.

An alternative to E&M supervisory signaling is FXS/FXO. FXS and FXO cards are normally installed at opposite ends of the same channel, the FXS being provisioned at the remote end and interfacing to the station equipment, and the FXO interfacing to the central office equipment. An FXS channel interface card can be purchased with a ground start or a loop start option. Since a ground start interface is desired for the modem, and that cannot be obtained with an E&M channel bank card, an FXS channel interface card is used, as indicated in FIG. 7B. But with an FXS signaling format being used in the channel bank, the logic circuitry on the FXS card must be modified such that ground start loop interface signals to/from the modem are translated to/from the E&M supervisory signaling format. In other words, the EC utilizes an E&M signaling format, thinking that an E&M channel bank card is at the other end of the T1 link. In fact, what is there is an FXS channel bank card (because it can be connected readily to the modem via ground start loop interfaces which they both have), modified to emulate an E&M channel bank card so as to "trick" the EC switch. The modification is very simple because calls are one-way only; the modem does not originate a call to the EC network, and thus the FXS card must be capable of emulating E&M signaling only for calls made to the modem from the EC over the T1 link.

This is shown on FIG. 8. Although the various kinds of information which are transmitted will be described in detail below, suffice it to say that interface logic 84 on the channel interface card 78 converts between the signals received and transmitted by physical interface 82 (ground start loop signals) and the E&M supervisory signals, shown by the numeral 74, extended over the T1 link. In general, the three blocks 84, 90 and 92 which are shown in heavy outline on FIG. 8 represent the changes required in two standard blocks of equipment in order to implement the invention. The first standard block is a channel interface card 78 in the channel bank, and the change consists of some interface logic described above generally and to be described in detail below. As for the modem interface, which is part of the modem assembly, a standard MF receiver 90 must be added, and some protocol logic 92 is required. The latter is typically implemented by a microprocessor which executes the trunk protocol shown in FIG. 10. This trunk protocol is also depicted in modem 64 in FIG. 7B. A trunk protocol is required because it is an E&M trunk protocol which is being executed at the entrance to the EC network, at the left side of FIG. 7B.

It is a channel interface card and a modem interface sub-assembly which make up the two components of the Feature Group B trunk interface system. The interface system provides conversion of the physical interface while at the same time controlling execution of the Feature Group B trunk protocol, in this case E&M in order that it be possible to use T1 access facilities. As made clear in FIG. 8, the physical interface conversion is accomplished in the channel interface card, while the modem houses all of the protocol and signaling logic. The key to the implementation is to take a standard FXS channel interface card, optioned for a ground start interface, and to modify it to emulate E&M supervisory signaling at the digital channel interface in order to receive calls from the EC.

Figure 9:
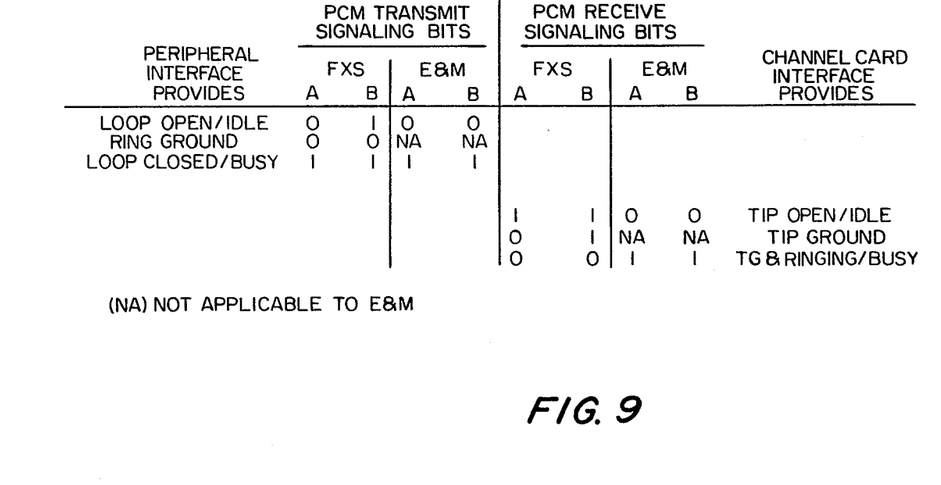
FIG. 9 is a chart which will facilitate an understanding of FIG. 8.

The basic difference between the FXS/FXO and E&M interfaces, and therefore the associated signaling formats, derives from the fact that E&M interfaces have loop(s)—a single pair or separate transmit and receive pairs—which are always operative. Supervisory signaling is not sent over these loops, but rather over separate signaling paths. The FXS/FXO interfaces, on the other hand, use the same loops for both transmission and supervisory signaling. It is therefore to be expected that the signaling formats differ, and they do as shown in the table of FIG. 9.

It will be recalled that there are two bits, referred to as A and B, which are transmitted in each direction for each channel in a T1 link, the two bits defining up to four possible states. Only two of these states are used in the E&M signaling format. That is because the transmission path is always operative, and the only supervisory signaling which must be transmitted in either direction is whether the associated equipment is idle or busy. (The terms on-hook/off-hook and loop-open/loop-closed have intuitive meaning but do not really characterize accurately a loop which is always operative.) With the FXS/FXO signaling format, however, additional information is required, namely, whether the tip or ring lead is grounded. Thus there are four states applicable to FXS/FXO signaling. (With this type of signaling, the on-hook/off-hook and loop-open/loop-closed terminology is applicable because the loop is not always operative.) In the table of FIG. 9, the left side represents what the Pulse Code Modulation (PCM) transmit signaling bits are when communication is to an Access Tandem. A peripheral interface, in this case a modem and channel interface card, is supposed to cause two bits A and B to change state depending on the peripheral interface status. If an E&M protocol is utilized, there are only two possibilities, 00 and 11, the former representing an idle condition and the latter a busy condition. In FXS signaling, on the other hand, a loop-open condition is represented by a 01 code and a loop-closed condition is represented by a 11 code. A ground on the ring lead of the interface is represented by a third state, 00. This state is not applicable in the E&M signaling format.

The right side of the table indicates the two bits transmitted by the Access Tandem for each of the two signaling formats, and what the channel card provides or does in response to each possible state. With E&M signaling, there are only two possible states for the trunk at the Access Tandem end of the link—idle and busy. In response to receipt of 00 and 11 codes, the channel card interface must effect physical interface signaling (see arrow 73 in FIG. 8) which represents the idle and busy conditions at the EC Access Tandem end. With FXS signaling, however, the corresponding states have exactly the opposite codes. The Tip Open and Idle states, which are analogous to each other in the FXS and E&M signaling formats, have codes of 11 and 00 in the two different formats. Similarly, the reverse codes are applicable for the corresponding states of Tip Ground (TG) and Ringing, and Busy, as indicated in the table of FIG. 9. The 01 code which represents a Tip Ground in the FXS signaling format is not applicable to EMM signaling for which it is not useful to talk about a tip (or ring) ground.

Referring to FIG. 8, the channel bank and its various channel interface cards 78 are located in the IC POP (shown by the numeral 30 on FIG. 6). In order to be able to use a ground start modem, a standard FXS card with a ground start option is selected; its physical interface 82 provides the necessary signaling 73 for the physical interface 88 of the modem. Because E&M signaling is used on the digital link, as represented by the numeral 74, additional interface logic 84 must be provided to convert between the E&M signaling on the link and the FXS signaling at physical interface 82. Referring to the table of FIG. 9, because ringing is not used for signaling to the modem and because no calls are originated by the modem, the channel interface card is not required to deal with the intermediate FXS seize states of tip ground and ring ground. The only states of interest are the E&M idle and busy states (add the corresponding FXS states on the left sides of the "/" marks) for both transmit and receive signaling.

Comparing the signaling formats, it is apparent that in the transmit direction (to the EC), there is a single difference. In the receive direction (from the EC), the relationship of the A and B signaling bits is the same, but the states are inverted. To modify an FXS channel interface card to emulate the E&M signaling format in order to receive calls, all that is required of interface logic 84 is that it (1) invert the states of the A and B receive signaling bits in going from left to right, and (2) cause the state of the B transmit signaling bit to follow the state of the A transmit signaling bit in going from right to left. The first modification changes received 11 and 00 codes to 00 and 11 codes respectively. The second modification changes transmitted 01 and 11 codes to 00 and 11 codes respectively.

An incoming E&M busy signal now results in a ground being placed on the tip side of the modem line to announce the arrival of a call, exactly as a call is announced with the ground start protocol. This ground serves as a trigger for the protocol logic in the modem. Similarly, an idle signal from the EC results in removal of the tip ground; this interrupts current flow to the modem and results in resetting of the interface and protocol logic, once again in conformity with the ground start protocol. All of this is accomplished by causing interface logic 84 to operate on the A and B bits received from the EC Access Tandem and to apply inverted bits to physical interface 82. In the other direction, a loop-open or loop-closed state of the modem, as sensed by the channel interface card in the usual manner, is translated from the usual FXS format to the outgoing E&M signaling format. All that this requires is that the B bit which is actually transmitted have a state which follows that of the A bit. This can be accomplished simply by breaking the connection on the channel bank backplane between the point which represents the B bit to be transmitted and the circuit which drives it, and tying that point to the point which represents the A bit; this will cause the B bit state which is transmitted to follow the state of the A bit.

Before describing the changes required in the modem interface, it will be helpful to understand what is represented by the functional diagram of FIG. 8. (Details of channel interface cards and modem interfaces are not required for an understanding of the present invention. For example, with reference to the interface logic 84 required for the channel interface card, the card of every manufacturer necessarily provide two points or terminals at which the A and B bits for each direction of transmission are represented, and it is certainly within the skill of the art to insert two inverters in one path and, in the other path, to disconnect one point from the circuit which drives it and to connect it instead to the other. It is the conceptualization of the invention which is more important than circuit details.) All transmission to and from the EC Access Tandem is digital in nature. If an E&M signaling format is used, as it is in the illustrative embodiment of the invention, multifrequency (MF) tones are transmitted for the address signaling. The FG/B trunks are merely a new use for the trunks which relay a call from one switch in an EC network to the destination switch in the same network. In relaying those calls, the called destination telephone number must be relayed as well. The FG/B protocol therefore accommodates this function which is vestigial since the IC's number was the number dialed. The dialed number is thus automatically transmitted in the E&M signaling format. The numeral 72 represents MF address signaling of this type. It should be borne in mind that although the signaling comprises tones, the tones are digitized just as are voice signals on the same channel. The analog-to-digital conversion block 80 converts the digitized transmission to analog transmission, in the form of voice and MF tones mixed together. The analog signals pass through the physical interfaces 82 and 88 to MF receiver 90 (the reason for which will be described below), and to the modem front end. In the reverse direction, analog signals from the modem are converted to digital form in block 80 for transmission to the EC Access Tandem.

The digital transmission includes two low-speed bit streams for each channel and in each direction, the A and B bits referred to above, which represent signaling information. As described, the bit states represent different things depending upon the signaling format employed. But whatever the bits represent, they are stripped from the digital transmission and extended to/from interface logic 84 for processing as described above. Although arrow 74 is shown going to the EC Access Tandem, it is to be understood that the A and B signaling bits are actually part of the 64 kb bit stream at that point.

The modem itself is a ground start modem modified to support the "950-WXXX Access Without ANI Signaling" Feature Group B trunk protocol as defined by draft standards prepared by the Exchange Carriers Standards Association, Committee T1-Telecommunications. The modifications require the installation of an MF receiver to support the in-band MF address signaling required by the Feature Group B protocol (even though the address signaling is unnecessary as described above), and the implementation of the logic necessary to execute a trunk protocol from a ground start loop interface.

Multifrequency address signaling entails the transmission of combinations of two tones from a total of six, for a total of fifteen combinations. The signaling is in-band in the sense that it shares the voice frequency spectrum. While addressing is not required for the subject system, it is an inseparable portion of the Feature Group B protocol. Furthermore, while a call cannot be answered before the addressing is complete, the protocol does not contain a requirement that the addressing always be sent at the same absolute time in the protocol. The MF receiver 90 of FIG. 8 is used to provide a positive indication of the earliest possible time to answer a call. A programmable timer could be substituted for the MF receiver. However, there are two factors which make it better to use an MF receiver instead of a programmable timer. First, the use of a timer would necessarily leave open the possibility of a call being answered too soon, thereby forcing its abandonment and the generation of a trouble report at the EC switch. Second, were a timer used, then for some large percentage of calls some amount of time would elapse between when the call could be answered and when the call actually is answered, thereby increasing the authorization response delay. Because it is desired that a call be completed on the first try and because it is a goal to minimize the authorization time, an MF receiver is used. As soon as the prescribed sequence of address signaling is sensed by the MF receiver in the course of the Feature Group B protocol, the protocol logic in the modem interface can proceed with its response.

The MF receiver can be nothing more than a commercially available integrated circuit which meets all Bellcore performance specifications for such receivers. The Feature Group B protocol standard calls for the address to be transmitted while the IC's receiving device, in this case the modem, is in the on-hook (idle) state. As will become apparent below, the address signaling takes place following a "wink" by the modem, at which time the modem loop is open. With a conventional E&M interface, as associated with E&M signaling, the selected protocol for the Feature Group B trunks in the illustrative embodiment of the invention, the loop is always closed so there is no problem in sensing MF tones. But because channel interface cards with a ground start option are used in the illustrative embodiment of the invention, the physical interface between each card and its associated modem is a loop which is normally open. Bellcore specifications set a maximum limit for the current which may flow through a loop when it is in the open state. This means that the MF receiver used in the invention must respond to currents less than the maximum current which is permitted when the loop is open. However, this poses no problem and, in fact, off-the-shelf MF receiver integrated circuits can do the job.

Figure 10:
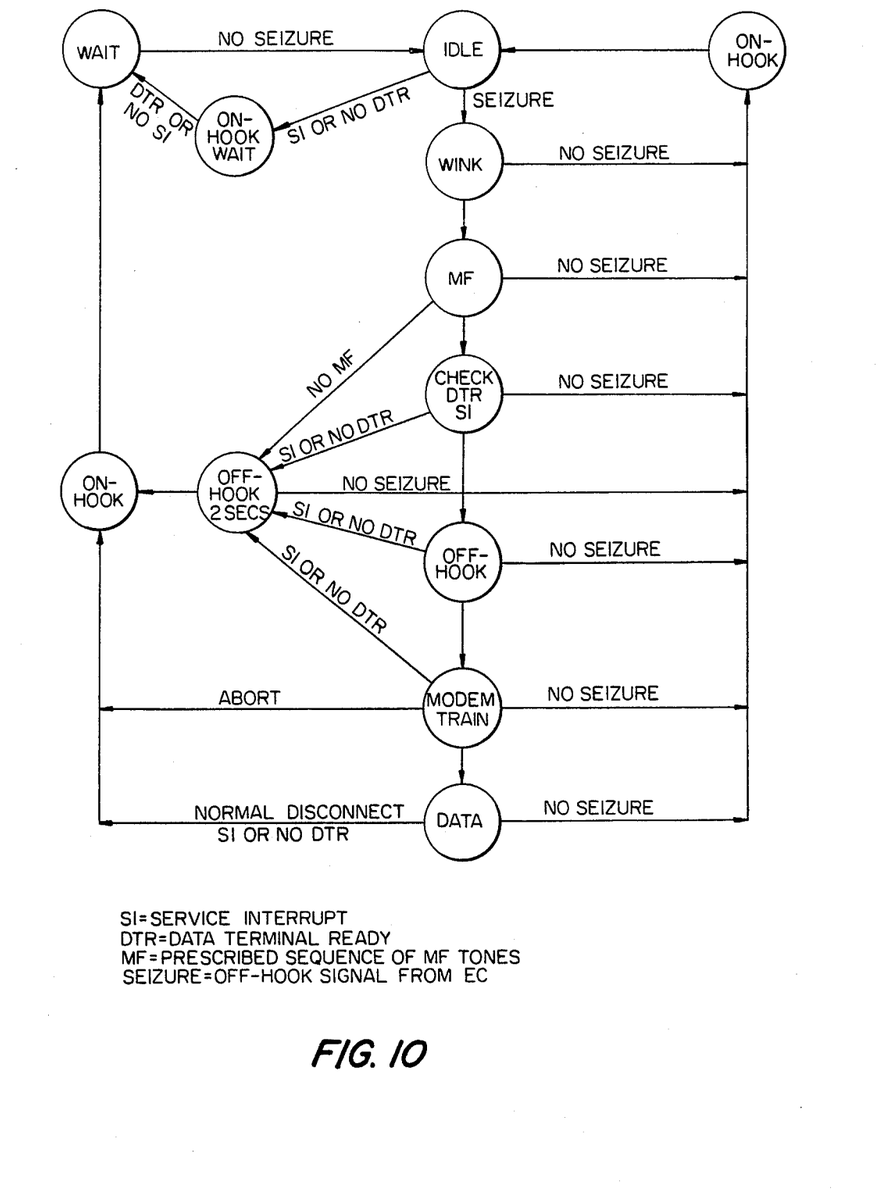
FIG. 10 is a flow chart which depicts operation of protocol logic block 92 of FIG. 8.

The Feature Group B trunk protocol calls for a wink to be returned by the modem following an off-hook signal from the EC. (Hereinafter, the terms on-hook and off-hook will be used even with reference to E&M signaling.) The wink is an off-hook followed by a return to on-hook. The time from receipt of the off-hook by the modem until the wink occurs, and the duration of the wink, can both fall within a range of times as provided for in the protocol standard. The actual answering of the call requires a final off-hook signal from the modem. But the final off-hook state can only follow a prescribed sequence of MF tones as defined by the protocol standard and other Bellcore documentation, if the call is always to be answered successfully. That is the reason for extending the output of MF receiver 90 to the protocol logic 92 which controls the interface states; the final off-hook state is based on receipt of the prescribed sequence of tones. A call termination similarly follows prescribed protocol standards. The protocol logic itself is shown in FIG. 10. It is implemented in practice under control of a microprocessor in the modem. With reference to FIG. 10, the following sequential steps are involved in handling a call:

(1) The Access Tandem goes off-hook. Because an E&M trunk protocol is involved, what the channel interface card receives over the T1 data link for the A and B bits is a 11 code (the "Busy" code in FIG. 9).

(2) The channel interface card receives the A and B bits on the respective T1 channel. Because interface logic 84 in the FXS card 78 inverts the A and B bits in the left-to-right direction of FIG. 8, what is delivered to physical interface 82 is a 00 code for the A and B bits. Referring once again to the right side of FIG. 9, but to the FXS column instead of the E&M column, a 00 code in FXS signaling represents the same thing as a 11 code in E&M signaling. Consequently, the channel interface card, which, except for the switching around of A and B signaling bits still operates as an FXS interface card with a ground start option, places a ground on the tip side of its analog interface to the modem. (Ringing power is not supplied to the channel bank and therefore ringing will never be present in this state.)

(3) The modem senses the ground on the tip. Referring to FIG. 10, the modem is initially in the idle state (top, middle). Following a seizure of the trunk by an incoming call (the seizure must be for a prescribed interval, e.g., 150 milliseconds), the modem executes a wink in response. The wink is begun by physical interface 88 closing the analog interface loop. The flow chart of FIG. 10 shows that if during the course of the wink a "no seizure" condition arises, i.e., the EC releases the trunk, then the modem terminates the call at its end by going on-hook and then returning to the idle state. The interface logic 84 determines that the trunk has been released by the EC via the signaling bits A and B, and controls termination of the call prematurely just as happens at the end of a complete call, as will be described below.

(4) The channel interface card senses the loop closure at the start of the wink and sends a signal back to the EC which informs it that the loop at the IC end of the link has been closed. The codes involved are set forth in the left column of FIG. 9. Physical interface 82, which operates in accordance with the usual FXS signaling format, ordinarily controls the transmission of a 11 code to indicate the closing of the loop, i.e., a busy condition.

In order to transmit this state to the EC, the code which is necessary is 11 in both FXS and E&M signaling formats. As described above, interface logic 84 is wired so that what is transmitted to the EC for the B bit is always what is transmitted for the A bit. In this particular case it makes no difference because even the B bit is a 1. In any event, a 11 code is transmitted to the EC to inform it that the analog interface loop at the modem is closed.

(5) The EC receives this off-hook or busy signal from the IC when it recognizes a 11 code for the A and B bits. The EC now waits for termination of the wink.

(6) The modem concludes the wink by going back on-hook, i.e., it opens the analog loop interface.

(7) The channel card physical interface detects the open loop. Referring to the FXS column on the left side of FIG. 9, physical interface 82 normally operates to send a 01 code to the EC to indicate an open loop state. In E&M signaling, however, the corresponding idle state is represented by a 00 code. It is in order to accommodate this difference in the two codes that interface logic 84 causes the B bit to follow the A bit for signal flow in the right-to-left direction. Because the A bit is a 0, the B bit is made a 0 also and the resulting 00 code, in the E&M signaling format, represents an idle loop state.

(8) The EC, in responding to what it thinks is happening at a conventional E&M interface at the other end of the link, sees the end of the wink and sends the in-band MF address signaling as part of the standard Feature Group B trunk protocol.

(9) It is at this point that the MF receiver 90 which is added to the modem interface does its job; its job is nothing more than to sense the presence of MF tones in order that the call be handled as rapidly as possible even though the information content in the signaling is not required. The MF receiver senses the tones, and protocol logic 92 detects that the prescribed sequence has been received. This is shown by the "MF" entry on FIG. 10. Once again, during the course of the signaling a no-seizure state results in the modem going on-hook and a return to the idle state; if the EC has hung up, so should the IC. (Almost all subsequent steps in the processing also allow for a hang-up following release of the trunk by the EC, and repeated references to this cycling will not be made.) As soon as the protocol logic senses that the proper sequence of MF signals was received, the modem goes off-hook by closing the analog interface loop once again. As shown on the flow chart of FIG. 10, however, if the prescribed MF signals are not sensed ("no MF"), which in the protocol means that they are not sensed within a prescribed time interval, then the protocol logic causes the modem to simulate an off-hook condition for two seconds, following which an on-hook state ensues. While the protocol logic is looking for the prescribed MF tone sequence, the modem is on-hook. If the prescribed sequence is not sensed, it might be thought that the modem should simply remain on-hook. However, what is actually done is to cause the modem to go off-hook for two seconds, and only then to go back on-hook and to remain there. The reason for this is that the EC is in the process of executing the trunk protocol. The easiest way to control a hang-up at the EC end of the link is to make the EC trunk interface think that the call has been answered in the usual way and that the called party has hung up. This is simulated by effecting an off hook state for two seconds, followed by an on-hook state. (The EC receives the state information in the same way that it receives it during the wink procedure.) Protocol logic 92 then waits for the EC to go on-hook; this is indicated at the upper left of the flow chart of FIG. 10. When the EC sends the appropriate signaling bit code 00 (inverted by interface logic 84 to a 11 code), which is tantamount to a no-seizure condition, the modem returns to the idle state. [When in the two-second off-hook state, a no-seizure condition results in going straight to on-hook and then idle, without going through a wait state; there is no need to wait because it is the EC which has already gone on-hook.]

(10) In the usual case the modem will detect the prescribed sequence of MF tones and it will go off-hook. The channel interface card senses the loop closure and physical interface 82 would ordinarily control the transmission of a 11 code to the EC. Interface logic 84 does not change the code since the B bit follows the A bit when signaling is from the IC to the EC, and in this case both bits are a 1.

(11) The EC senses the off-hook state and connects the calling party through to the IC. The communications now take place between the calling party and the modem. The calling party is usually the first to hang up. However, if the modem should hang up first for any reason, the following sequence is simply reversed.

(12) When the calling party (the credit card authorization terminal) hangs up, the EC goes on-hook. The E&M signal which is transmitted to the IC over the T1 data link takes the form of a 00 code for the A and B bits; as indicated on the right side of FIG. 9, in the E&M column, an idle condition is represented by a 00 code.

(13) The channel interface card receives the onhook signal. The 00 code is changed by interface logic 84 to a 11 code. Physical interface 82 treats the 11 code as an FXS format tip-open signal which calls for it to remove the ground on the tip side of the analog interface to the modem.

(14) The modem senses the loss of the ground on the tip, and it opens the analog interface loop.

(15) The channel card detects the open loop, and the physical interface 82 causes the A bit to go low and the B bit to go high. Interface logic 84 causes the B bit to follow the A bit, so that a 00 code is transmitted on the T1 data link.

(16) The EC recognizes the on-hook signal (00 in E&M format) from the IC, and clears the trunk for the next call.

While this completes the call sequence, there is still more to consider in the protocol logic depicted in FIG. 10. The symbol SI represents a service interrupt; a typical modem includes a switch which allows a technician to take it out of service. The symbol DTR represents a conventional data-terminal-ready indication received from upline, to inform the modem that the host and network are prepared for communications. If either an SI condition exists or a DTR condition does not, calls should not be completed. As shown at the top left of FIG. 10, in either event the protocol logic cycles from the idle state to an on-hook wait state. The modem waits until the DTR signal returns or the SI signal drops. At this time the protocol logic cycles to the wait state, and as soon as the EC is on-hook a transition is made to the idle state.

In the sequence description above, it was said that following detection of the prescribed sequence of MF tones, the modem goes off-hook in preparation for the actual credit card authorization data communications. As shown in FIG. 10, however, before actually going off-hook, the modem checks the DTR and SI statuses.

If there is a service interrupt, or if the data terminal is not ready, instead of the modem going off-hook in order to process the call, the modem goes off-hook for only two seconds in order to effect a hang-up. Also as shown in FIG. 10, even if the modem remains off-hook to process the call, if at any time the SI signal goes high or the DTR signal goes low, the hang-up sequence takes place.

Assuming that all things are normal, once the modem goes off-hook, the data communications sequence begins with conventional modem training. Once again, in the event of an SI condition or the absence of a DTR condition, the call is terminated in the usual way. Similarly, if the modem training cannot be completed, the attempt is aborted, following which the modem goes on-hook, waits until the EC responds similarly, and then enters the idle state. Following modem training, if successful, the data transmission sequence ensues. The normal disconnect sequence was described above, and the same sequence takes place if during the course of the data transmission service is interrupted or the host computer drops the DTR signal.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A system for connecting selected calling stations to a predetermined destination over the public telephone switched network, said public telephone switched network having central offices for effecting switched connections between station lines and trunks, and trunk switching facilities, divided into (a) a plurality of Local Access and Transport Areas (LATAs) under control of Exchange Carriers (ECs), and (b) a plurality of Interexchange Customers (ICs) for providing telecommunication services between access facilities in one LATA and access facilities in another LATA, said ICs having a choice of Feature Group line-side and trunk-side switched access arrangements, with the charge of an EC for a call partially handled by an IC which interfaces with the EC via a Feature Group access facility trunk being borne solely by the IC and in no part directly by the calling station; comprising a group of modems situated at the location of at least one of said access facilities; and communication channel means interconnecting each group of modems with said predetermined destination; each of the modems situated at the location of an access facility having an associated dedicated means for interfacing with a respective Feature Group trunk accessed by said selected calling stations through an EC, and for extending communication over the interconnected communication channel means to said predetermined destination.

2. A system in accordance with claim 1 wherein the trunks interfaced with said dedicated means are Feature Group B or Feature Group D trunks as defined by the Federal Communications Commission.

3. A system in accordance with claim 2 wherein each of the modems situated at the location of an access facility exercises a trunk protocol but appears to a connected calling station as a modem terminating a line.

4. A system in accordance with claim 3 wherein all of said selected calling stations have automatic dialers, said automatic dialers dialing the same 7-digit number independent of the LATA in which the calling station is situated.

5. A system in accordance with claim 3 wherein the Feature Group trunks at an access facility are grouped as individual channels in a T1 digital link, and each of said interfacing means includes a channel bank card.

6. A system in accordance with claim 2 wherein all of said selected calling stations have automatic dialers, said automatic dialers dialing the same 7-digit number independent of the LATA in which the calling station is situated.

7. A system in accordance with claim 2 wherein the Feature Group trunks at an access facility are grouped as individual channels in a T1 digital link, and each of said interfacing means includes a channel bank card.

8. A system in accordance with claim 7 wherein an EC controls execution of a trunk protocol on Feature Group B and Feature Group D trunks which includes the transmission of multifrequency (FF) address signaling and the sensing of a response thereto, and each of said interfacing means includes MF receiver means for detecting MF address signalling and for controlling a response thereto.

9. A system in accordance with claim 8 wherein said trunk protocol includes E&M signaling, said modems execute a ground start loop protocol, and each channel bank card is an FXS card with a ground start option adapted to translate between E&M signaling and ground start loop signaling.

10. A system in accordance with claim 2 wherein an EC controls execution of a trunk protocol on Feature Group B and Feature Group D trunks which includes the transmission of multifrequency (MF) address signaling and the sensing of a response thereto, and each of said interfacing means includes MF receiver means for detecting MF address signalling and for controlling a response thereto.

11. A system in accordance with claim 1 wherein an EC controls execution of a trunk protocol on Feature Group trunks which includes the transmission of multifrequency (MF) address signaling and the sensing of a response thereto, and each of said interfacing means includes MF receiver means for detecting MF address signalling and for controlling a response thereto.

12. A system in accordance with claim 11 wherein said trunk protocol includes E&M signaling, said modems execute a ground start loop protocol, and each interfacing means includes a channel bank FXS card with a ground start option adapted to translate between E&M signaling and ground start loop signaling.

13. A system in accordance with claim 1 wherein all of said selected calling stations have automatic dialers, said automatic dialers dialing the same 7-digit number independent of the LATA in which the calling station is situated.

14. A system in accordance with claim 1 wherein each of the modems situated at the location of an access facility exercises a trunk protocol but appears to a connected calling station as a modem terminating a line.

15. A system in accordance with claim 14 wherein said modems execute a ground start loop protocol, and each interfacing means includes a channel bank FXS card with a ground start option adapted to translate between E&M signaling from/to an EC and ground start loop signaling to/from a modem.

16. A method of constructing a credit card authorization network over the public telephone switched network comprising the steps of:
 (a) providing a group of dedicated trunk-protocol executing interfaces for respective Feature Group trunks,
 (b) providing an associated dedicated modem for each of said interfaces, together with means for operating the modem in accordance with a call extended through the respective Feature Group trunk,
 (c) providing a plurality of credit card authorization terminals for automatically accessing said Feature Group trunks through an Exchange Carrier, and
 (d) providing a communication channel for connecting said modems to a host computer.

17. A method in accordance with claim 16 further including the step of obtaining an authorized 3-digit Customer Identification Code (CIC) in order to secure access to said Feature Group trunks.

18. A method in accordance with claim 17 wherein said Feature Group trunks are Feature Group B, and further including the step of providing said plurality of credit card authorization terminals with automatic dialers for dialing a 7-digit telephone number which includes said 3-digit CIC code.

19. A method of constructing a special-purpose communications network over the public telephone switched network comprising the steps of:
 (a) providing a group of dedicated trunk-protocol executing interfaces for respective Feature Group trunks,
 (b) providing an associated dedicated modem for each of said interfaces, together with means for operating the modem in accordance with a call extended through the respective Feature Group trunk,
 (c) providing a plurality of special-purpose terminals for automatically accessing said Feature Group trunks through an Exchange Carrier, and
 (d) providing a communication channel for connecting said modems to a host computer.

20. A method in accordance with claim 19 further including the step of obtaining an authorized 3-digit Customer Identification Code (CIC) in order to obtain access to said Feature Group trunks.

21. A method in accordance with claim 20 wherein said Feature Group trunks are Feature Group B, and further including the stop of providing said plurality of special-purpose terminals with automatic dialers for dialing a 7-digit telephone number which includes said 3-digit CIC.

22. A system for allowing a ground start loop modem to operate off a trunk over which communication is governed by the E&M trunk protocol comprising a ground start loop interface for the modem which includes means for executing the E&M trunk protocol, and an FXS channel card with a ground start option, connected between the trunk and the modem interface, which includes means for translating between E&M signaling and ground start loop signaling.

23. A system in accordance with claim 22 further including a multifrequency receiver in said interface for detecting multifrequency address signaling and for controlling said E&M trunk protocol executing means in accordance therewith.

* * * * *